Dec. 11, 1951     C. D. WILLSON     2,577,836
MOBILE DWELLING
Filed Feb. 2, 1948     4 Sheets-Sheet 1
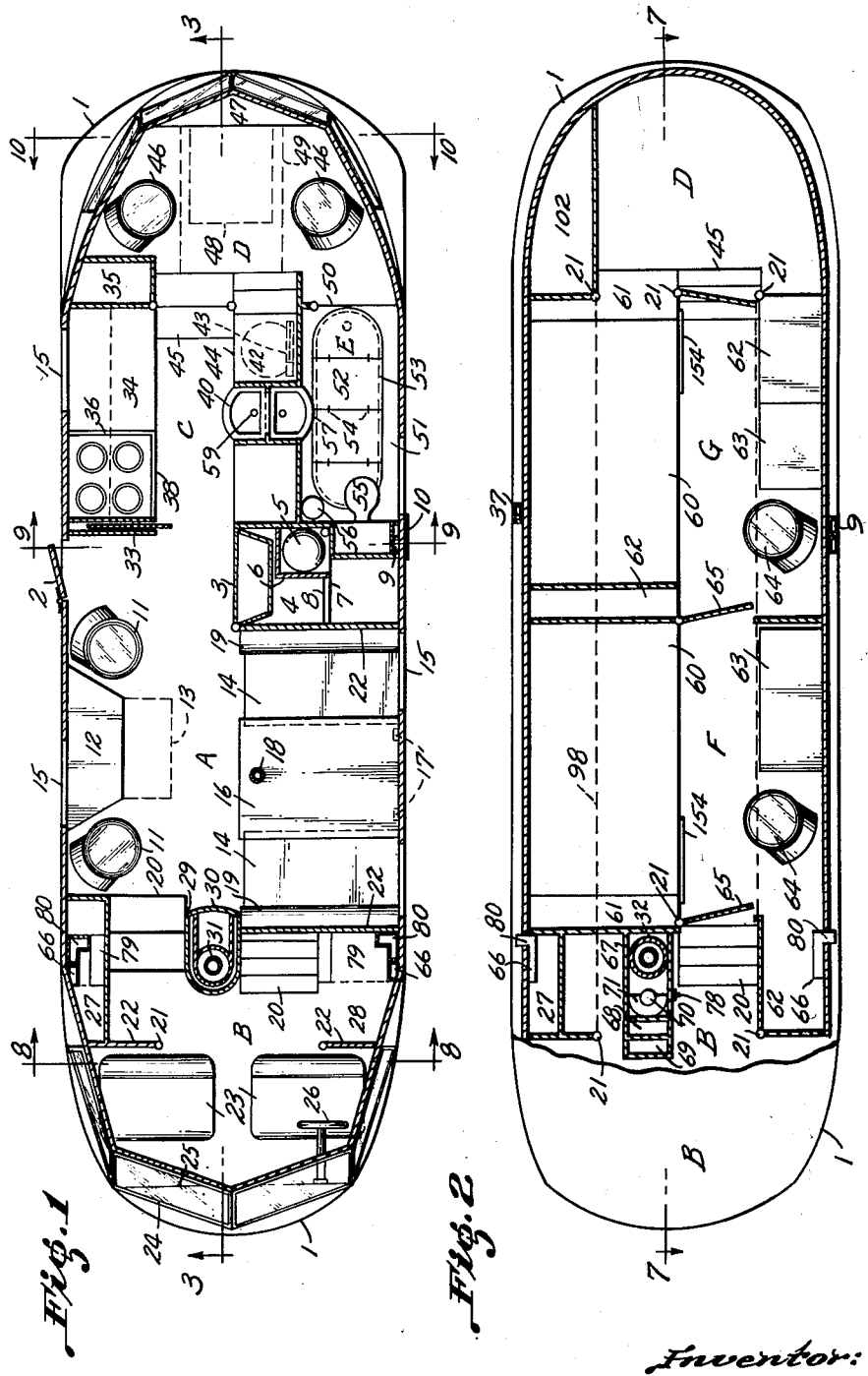
Inventor:
Corwin D. Willson Dec. 11, 1951  C. D. WILLSON  2,577,836
MOBILE DWELLING
Filed Feb. 2, 1948  4 Sheets-Sheet 2

Inventor:
Corwin D. Willson

Dec. 11, 1951 C. D. WILLSON 2,577,836
MOBILE DWELLING
Filed Feb. 2, 1948 4 Sheets-Sheet 3
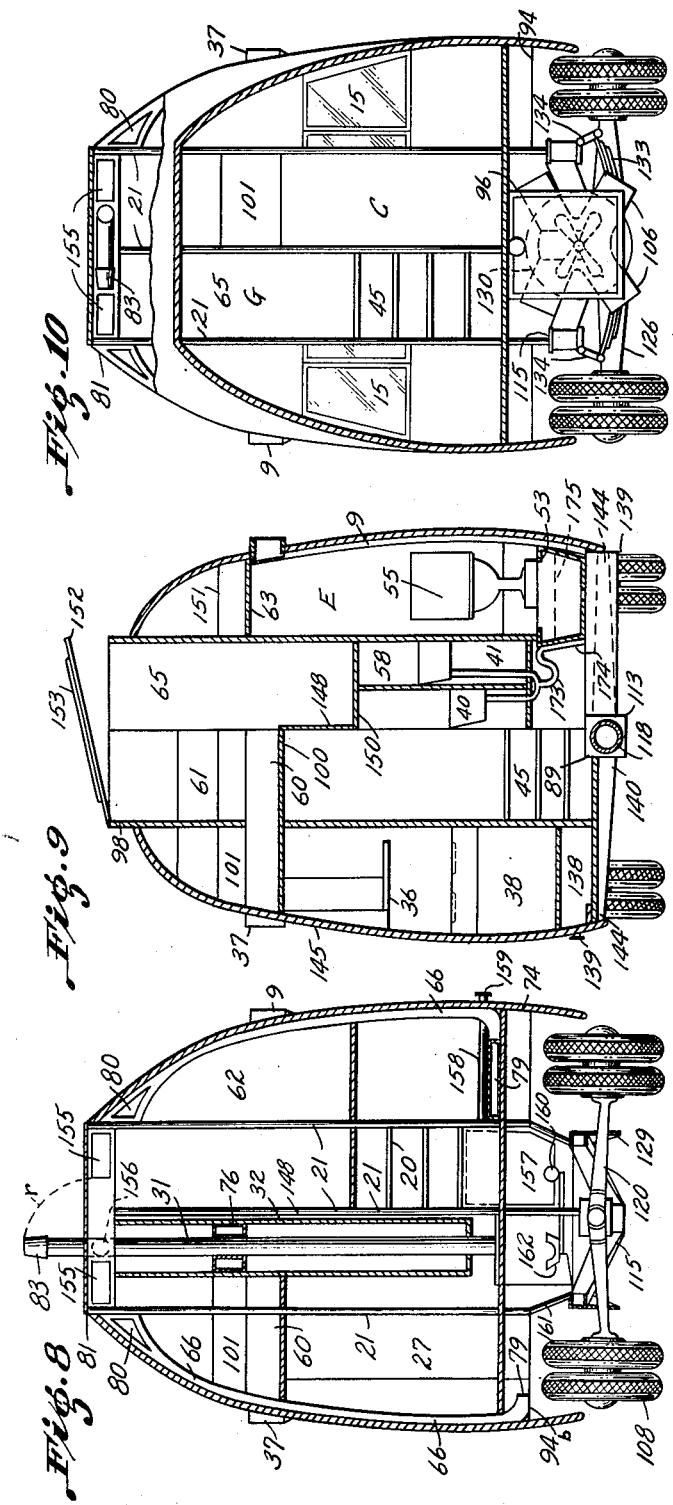
Inventor:
Corwin D. Willson Dec. 11, 1951     C. D. WILLSON     2,577,836
MOBILE DWELLING
Filed Feb. 2, 1948     4 Sheets-Sheet 4
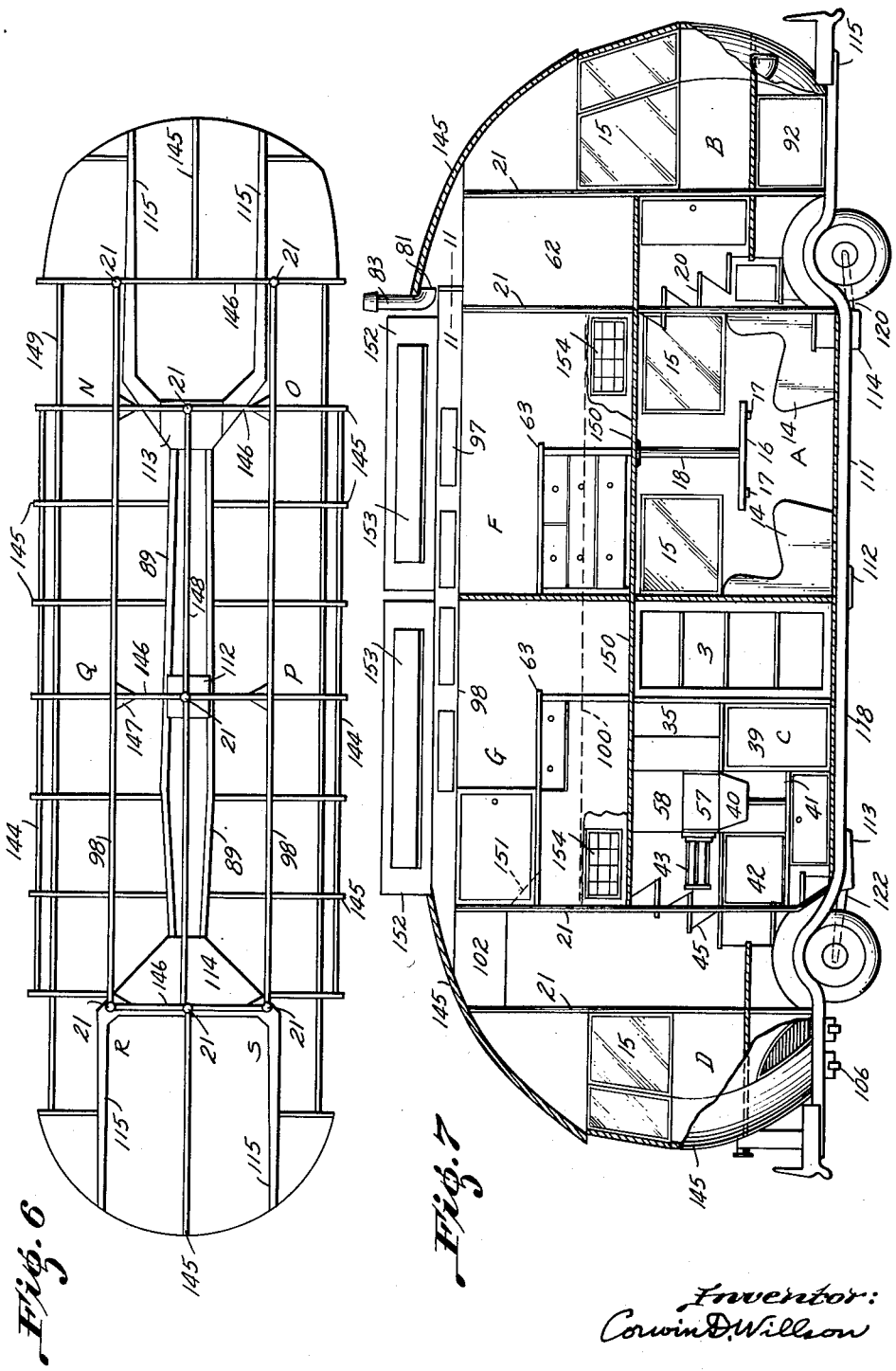
Inventor:
Corwin D. Willson Patented Dec. 11, 1951

2,577,836

UNITED STATES PATENT OFFICE 2,577,836

MOBILE DWELLING

Corwin D. Willson, Flint, Mich.

Original application April 4, 1942, Serial No. 437,708. Divided and this application February 2, 1948, Serial No. 5,762

22 Claims. (Cl. 296—23)

1

This invention relates to shelter of the mobile type and, more particularly, to a space-saving family-dwelling having an extremely strong and stiff body of light weight and dimensions legal of common transit as a road vehicle and interiorly divided to comprise, in the easy riding zone between the back of the front wheels and the front of the rear wheels, two fixed bedrooms having floors at less than story height above the floor for a three-room house-keeping apartment of living-dining lounge, kitchenette and bath, the lounge being longer than the width of the body. This invention is a division of my abandoned application Serial #437,708 filed April 4, 1942.

To our uncivilized Indians a teepee was a mobile dwelling. Patents have been issued describing camping vehicles each consisting of a stock automobile chassis carrying a body designed for vacation, i. e., temporary, housekeeping and with a minimum provision for the spaciousness and sanitation we moderns have come to associate with habitation. As used herein, the expression "mobile dwelling" is intended to define, as a new product for industrial fabrication, a much more spacious shelter structure adequate both in motion and when parked for the sanitary year-round private habitation of an entire average American family and in a manner ensuring almost that degree of group comfort and individual privacy to be found in the average four-to-five room fixed apartment. The invention concerns the totality of means whereby so much livability is concentrated in a space substantially less than commonly is available in fixed houses to the average American family but substantially more than is available in trailer coaches. Whereas the latter are designed only for use when parked, "mobile dwelling" as used herein defines means implementing family dwelling comfort and exhilaration in motion.

Prior art describes vehicles more than ample in size to have been subdivided and equipped for adequate dwelling comfort in motion and for individual privacy, had this been their primary purpose. These include rail vehicles designed not for constant family use in private habitation but for public and intermittent individual use in transport. One patent describes a double-deck rail coach having an overall height nearly double, and a length seven times its width. Such a coach, within the limits of size and weight permissible on rail lines, could enclose 12,000 cu. ft. of space which is equal to that of a fixed dwelling apartment having a floor area 30' x 40'. Even a conventional single deck steel rail coach fitted as a combined club-diner and Pullman sleeper could serve a railroad executive's family

2 and retinue as a temporary dwelling. But its length of 80' exceeds the 30' permitted road vehicles, just as its width of 10' exceeds the 8' width permitted road vehicles. In addition, its weight of 56 tons would exceed the load permitted on many highways and its cost of $50,000 would put it far beyond consideration for dwelling use by the average American family. No inventive skill would be required to adapt so much space to adequate family habitability. It is apparent that rail vehicles may be made so very long because they run on a relatively level track tending to maintain a fixed clearance between the bottom of the vehicle and the roadbed. In the railcoach described in the aforesaid patent, the distance between the back of the front wheels and the front of the rear wheels is seen to measure five times the width of the coach. Such a long wheelbase is made impractical in low-slung road vehicles intended to traverse uneven terrain. A primary object of my invention is a low-slung vehicular shelter designed to be safely driven off improved roads and into woods and fields and having the distance between the back of the front wheelwells and the front of the rear wheelwells not substantially exceeding twice the body width.

In a road vehicle, the total in-transit body volume is limited to that possible under the restrictions as to size and weight imposed by statute and by bridge strengths, overhead obstructions and hairpin road turns. Analysis of these limitations indicates that a safe average of maximum in-transit dimensions for road vehicles is: length, 30'; width, 8'; height, to clear a 12' underpass. With allowances for road-clearance and streamlining, these overall dimensions permit a maximum in-transit body volume of around 2,500 cu. ft., or from one-third to one-fifth that possible in a railcoach. Thus, another object of the invention is a vehicular shelter having a lightweight and highly torque-resistant body shell of under 2,500 cu. ft. volume and meeting in-transit limitations as to size and weight covering common road vehicles.

Another object of the invention is a multi-deck automotive land cruiser having a top closely clearing a 12' underpass and a wheelbase not substantially longer than twice the width of the body; and having an inside supporting framework and an outside supported shell, parts of one being spaced from parts of the other, and rigid web-like ties fixed horizontally and vertically between the spaced parts and interiorly dividing the body into several major subdivisions at different intercommunicating levels.

Another object of the invention is a space-saving extensible mobile dwelling having a rigid body interiorly divided into fixed upper and lower major subdivisions including floors therefor, and ceilings for the lower subdivisions spaced at story heights on opposite sides of the lengthwise center axis of the body, a substantial lengthwise area of the body roof closely clearing a 12' underpass and being flatter than the outwardly and downwardly curving opposite fixed portions of the roof, and upper of said floors extending between and below said ceilings and at less than story height from the lengthwise roof area: a greater part of that area comprising opening closures upwardly adjustable, as by tilting, to increase the normal vertical space directly thereunder.

Another object of the invention is a road vehicle body of substantial size having a highly twist-resistant backbone member like a keelson or box-girder in a midpart thereof and between upwardly forked widely spread opposite ends fixed to end extremities of the body at a substantial distance below end-decks fitting into an outward bulge that runs horizontally completely around the body.

Commonly, much of the space directly above and below table tops and below beds is wasted. Thus, another object of the invention is the better utilization of space commonly of little use in dwelling structures and the use of parts of the furniture in the basic structure of the dwelling body itself: as for example, the bottom of a legless bed or berth serving directly as the ceiling of a lounge or kitchenette below; the ceilings above lounge table and kitchen dresser being of less than story height to increase head-height in the story above; the bottom of a dresser top serving directly as ceiling for the bathroom below; and the like.

Another object of the invention is a low-slung road vehicle body having a side door between front and rear wheels and at the general level of the mainfloor and having the space-saving and weight-reducing and torque-resisting features of my mobile dwelling in adaptation to meeting such other special needs as for mobile display and sales and service shops, professional offices, field laboratories, travelling clinics, military quarters and adequate to house such specialized activities on tour or parked and in any climate.

These and other novel features and objects of the invention are hereinafter more fully described and claimed, and the preferred form of such a mobile dwelling, automotive land cruiser or multi-decked road vehicle is shown in the accompanying drawings, in which:

Fig. 1 is a floor plan of the dwelling showing the lower story or mainfloor midportion and the end decks at a level less than midway between the lower and upper stories of the body.

Fig. 2 is a floor plan of the upper story.

Fig. 5 is a section of the floor taken on line 5—5 of Fig. 4.

Fig. 6 is a top view of the structural stiffening of the body, including the inner framework spaced from the intermediate side-parts of the outer ribs.

Figure 3:
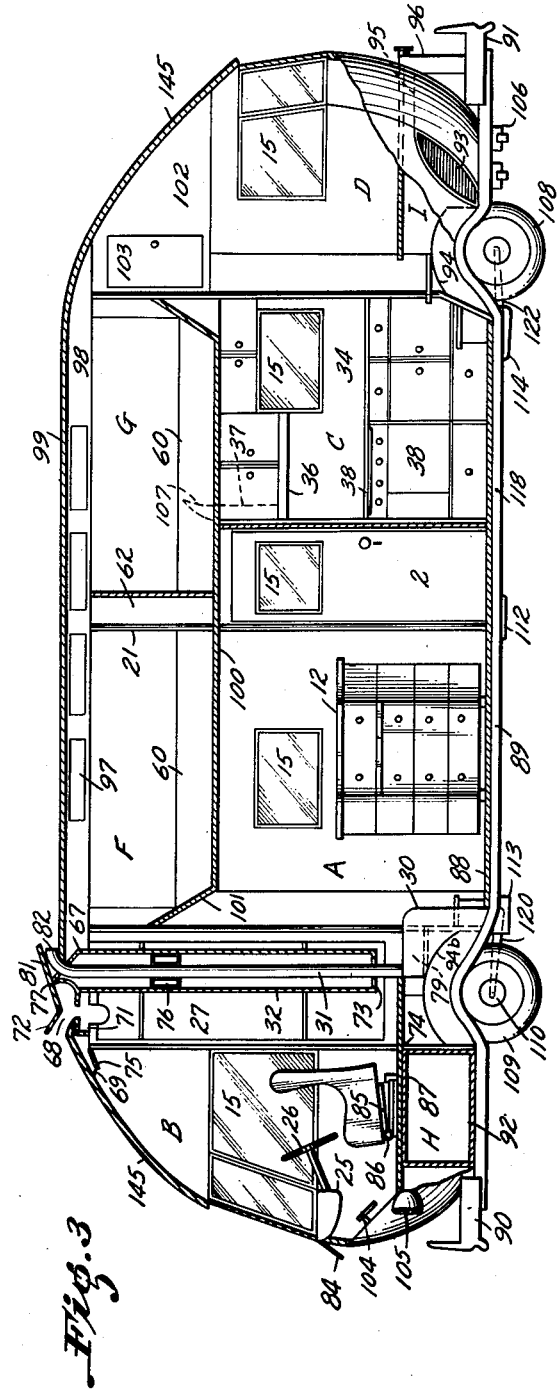
Fig. 3 is in part a longitudinal section of the dwelling taken on line 3—3 of Fig. 1.

Fig. 7 in part is a longitudinal section of the dwelling taken on line 7—7 of Fig. 2.

Fig. 8 is a transverse section taken on line 8—8 of Fig. 1.

Fig. 9 is a transverse section taken on line 9—9 of Fig. 1.

Fig. 10 is a transverse section taken on line 10—10 of Fig. 1.

Fig. 11 is a longitudinal section take on line 11—11 of Fig. 10.

Fig. 12 is a view of Fig. 11 with air-scoop open.

The mainfloor and intermediate end decks of the preferred form of mobile dwelling are shown in plan in Fig. 1, in which the rigid outer shell 1 is interiorly subdivided for maximum use of the space enclosed. Not more than two steps up from the roadbed, door 2 in the side of shell 1 gives direct entrance into the main lounge A, which is a combined sitting and dining room. In-a-door cabinet 3 serves as opening closure for utility and storage closet 4 containing a hot water storage tank 5 in insulated covering 6 and shelves 7 above storage tank 8 for fluid wastes and vented by double stack 9 adjacent exterior covering 10 for shell 1. Chairs 11 stand one at either side of dresser 12 having a pull-out segment 13 that serves as writing desk or table top. Spaced double seats 14 adjacent windows 15 are on opposite sides of demountable table top 16, one end held by wall-hooks 17, the opposite end suspended by leg 18 from ceiling. Back cushions 19, when desired, are used to convert double seats into a Pullman berth.

Up three risers 20, forward end deck B stiffens intermediate side parts of columns 21 which are laterally connected with the outwardly bulging sides of shell 1 by vertical web-like ties 22 which thus have the character of bulkheads dividing deck B into two parts, the forward part housing the pair of double driving seats 23 which, in a manner not here shown, are manipulatable to provide another berth. Seats 23 face transparent windshield 24, instrument panel 25 and steering wheel 26. The rearward part of deck B comprises wall cabinet 27, wrap closet 28 and four more risers 20 to the upper floor or story. The seven risers 20 will be referred to as the front stairway and it is apparent that the foredeck B is an enlarged landing in this stairway.

At the mainfloor level and between lounge A and foredeck B is insulating screen 29 for combustion chamber 30 of space-heater having exhaust pipe 31 for the products of combustion and surrounded by heat-exchange drum to be described hereinafter. Sliding door in hollow wall 33 may be used to separate lounge A from kitchenette C containing worktop dresser 34, cupboards 35 and canopy 36 with vent 37 for cookstove 38. Refrigerator with worktop 39 stands beside sink 40 that fits demountably into the top of one of the double laundry tubs 41 beside mechanical washer having tub 42 adjacent wringer 43 and under demountable worktop 44.

Up three risers 45, rear end deck D has chairs 46 facing cabinet 47 with drop-leaf tabletop 48 above hatch 49. Down one riser 50 from afterdeck D is bathroom E with fixed floor 51 having sequentially removable sections 52 resting on flange 53 of body-bathing receptacle, here a shallow 5' tub below level of floor 51. Hinges 54 permit person entering bathroom E, which has a total floor area only slightly exceeding that occupied in the average fixed house by the bathtub, to fold back part of the floor, step down into tub, fold up removable sections 52 and place them on adjacent seat of toilet 55 before bathing. Water heater 56 for tank 5 is vented in stack 9. Removable lavatory tray 57 stands on top of laundry tub 41 in niche 58 in wall between kitchenette C and bathroom E, wall parts of niche 58 being attached to lavatory 57 so that they and sink 48 are removable to make laundry tubs directly accessible on washdays. Stoppered waste outlets 59 may drain directly into tub compartments or be fitted with short waste pipes (not shown) having resilient stoppered lower ends pushable down into the waste outlets of said compartments. Both lavatory and stool stand at levels for effective use from floor 51 and above sections 52.

The midportion of the body extends from the foredeck to the afterdeck and has an upper floor extending lengthwise between opposite end decks at less than story height above the lower mainfloor of the body. Up four risers 45 from afterdeck D is the upper story. The seven risers 45 will hereinafter be referred to as the rear stairway and it is apparent that the afterdeck is an enlarged landing in this stairway.

The upper story is shown in Fig. 2 to comprise two rooms, front bedroom F and back bedroom G, each containing a double legless bed 60 with end shelves 61, clothes-hanging space or closet 62, dresser 63 and chair 64. Doors 65 ensure individual privacy while permitting egress from either bedroom by either front or rear stairways. Bathroom E, insulated by closet 4 and kitchenette C from lounge A, is thus accessible to occupants of bedrooms and both end decks without passing through lounge, and danger of being trapped by fire at levels above the mainfloor is thus reduced to a minimum.

The problem of heating a moving body is different from that of heating a parked body and the heating and ventilating of my mobile dwelling must be equally effective under both conditions. Circulation of heated fresh outside air inside the body is obtained by the invention automatically by the forward movement of the body. The part played in this by ventilating ducts 66 will be hereinafter explained. Duct 67 joins an intake 68 for exterior air and an intake 69 for interior air with drum 32. Electric motor 70 attached to blower-fan housing 71 is positioned in duct 67 as seen in Fig. 3. Fresh exterior air under high pressure and velocity is deflected under the forward movement of the body by airscoop opening closure 72 for intake 68 into duct 67 and downwardly through drum 32 which has lower opening 73 near floor 74 of foredeck B. When exhaust pipe 31 is hot from products of combustion, forward movement of body produces a heat-exchanging downdraft through drum 32 and from opening 73. Thence the heated air rises to the high point of the backwardly sloping foredeck ceiling where opening-closure 75 of intake 69 permits passage of this heated air, already waste heat, into duct 67 where it is caught into the current of fresh outer air and carried into the heat-exchanger drum 32 and again through opening 73. When operated under parked conditions, airscoop 72 is closed and the heating system may then return to mere gravity circulation, air drawn into the opening 73 flowing from drum 32 via upper closable apertures 76. Or opening-closure 77 may be adjusted to permit a desired mixture of fresh outer air and heated interior air to flow into the blower fan housing 71, the electric motor 70 is turned on by switch 78 and the downdraft in drum is thus mechanically maintained.

Great amounts of air could not be forced into the body with all windows and doors closed by the automatic means described without expelling from the body an equal amount of air. Just as the forward movement of the body is utilized to force fresh air through the heat-exchanger into the body, so the same means is used to suck air from the body to maintain a normal pressure of air in the body. Ventilating ducts 66 at the lower ends have openings 79 and at the upper ends openings 80 in comb or undercut roofstep 81. The entire top and side portion of shell I above front windows 15 slant backwardly and outwardly and roofstep 81 extends from down one side and over the top to down the opposite side of this forward top portion of the shell. As the body moves rapidly forward a stream of air at high velocity passes over the top and sides of roofstep 81 to create an area of subnormal air pressure or suction therebehind at 82 into which exhaust pipe 31 is vented. This provides a draft adequate for the removal of products of combustion. A retractible chimney top 83 coactive with upper end of pipe 31 will be hereinafter further described. Fresh air forced in at intake 68 meets air in the body at normal pressure since an equal amount of air is simultaneously being sucked from the body via openings 80. By this means, the efficiency of the heat-exchange, dependent on the downdraft in drum 32, and adequate ventilation are maintained by the forward movement of the body and with closed doors and windows. Opening closure 84 admits exterior air when desired near feet of front seat occupants.

Bottoms of seats 23 are mounted on separate torque-arms 85 fixed to resilient torsion rods 86 each having an opposite end anchored by arm 87 to floor 74 whereby back and bottom of each seat 23 move as a unit under road shock. Mainfloor 88 of lower story is rigidly supported at the approximate level of the radial centers of front and rear roadwheels by a rigid backbone member 89, the midpart thereof having the character of a keelson and being hereinafter more fully described. Front bumper 90 protects storage compartment H under the foredeck and rear bumper 91 projects from power-drive compartment I under the afterdeck and accessible by hatch 49. Opening closure 92 gives access to compartment H. Airscoops 93 back of a pair of rear wheelwells 94 spaced on opposite sides of, and at a short distance from the back end of the body, carry air picked up at high velocity through ducts 95 and through radiator 96 into the area of lower air pressure behind the body. A similar pair of front wheelwells 94b are spaced on opposite sides of, and at a short distance from the front end of the body. In order to insure sufficient road-clearance over rough terrain for such a low-slung body, the distance between front and rear wheelwells does not exceed twice the body width. (Note: It is obvious that should it be desired to utilize a body in other respects similar to body shell I for a trailer drawn by truck tractor, storage compartment H could be shifted to the position of compartment I and the space now occupied by compartment H could be used for the supporting hitch and rear end of truck tractor.)

The lower story is lighted by windows 15 and the upper story by glazed apertures 97 in the longitudinal skeletal-beam side members 98 of a lantern roof having flattish top 99. Ceiling 100 at story height above mainfloor 88 comprises the actual bottoms of legless beds or berths 60 and at opposite ends ceiling 100 is bounded by diagonal wells 101 over the stairs between mainfloor 88 and opposite end decks. Storage space 102 in the stairwell slope of the roof over the afterdeck is accessible by door 103. Footbrake lever is indicated at 104; headlamp at 105; cylinders of primemover at 106; exterior outlet fairing 107 for vent 37. Pairs of roadwheels 108 with tires 109 and hubcaps 110 are positioned fore and aft so as to be snugly housed in wheelwells 94 and 94b.

Figure 4:
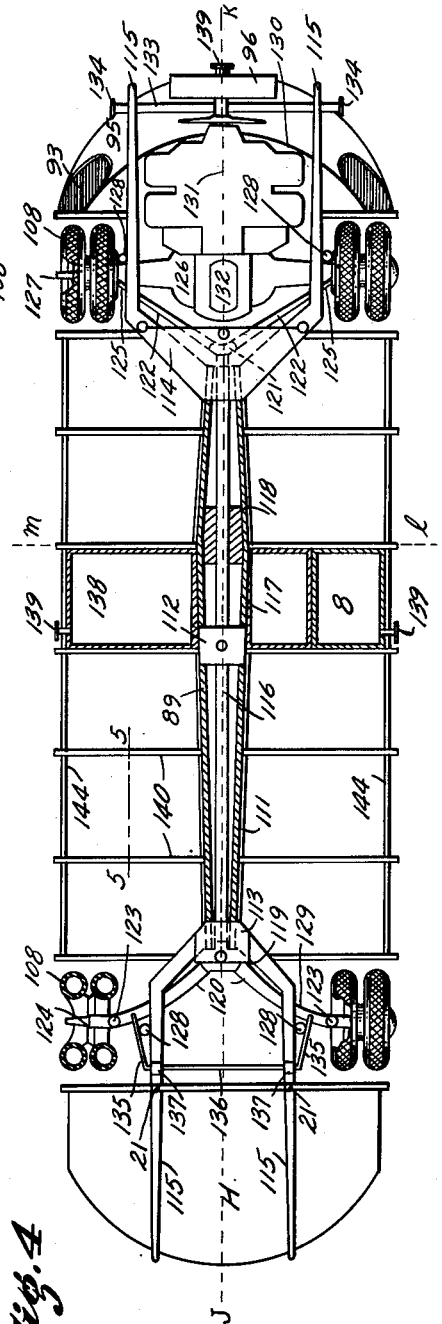
Fig. 4 is a plan of the substructure of the dwelling, including the chassis.

Backbone member 89 is seen in Fig. 4 to comprise side members, such as rigid metal channels, 111 very closely spaced on opposite sides of the longitudinal central axis of the body j—k and made rigidly integral by upper and lower center plates 112, upper and lower front plates 113 and upper and lower rear plates 114, so as to have a box-girder-like rigidity. This backbone has upwardly forked, widely spread parallel opposite ends 115 which are fixed to diagonally opposite end extremities of the body shell at a substantial distance below the fore and after decks to provide a maximum resistance to torque between those extremities in transit over very rough terrain. This form of backbone provides the same sort of stiffening for body 1 as does the keelson of a ship and tapers toward plates 113 and plates 114 from a point of greatest width nearest the heavier end of the body (in this instance between center plates 112 and back plates 114) to provide rigid support for a fulcrum in a system of suspension common to the four wheels. This system of suspension may be that described in my Patent #2,346,123, or that of my application Serial #540,774 filed June 17, 1944, now Patent No. 2,525,988, granted October 17, 1950, or that of my application Serial #774,325 filed September 16, 1947, so that the description of the suspension and stabilizing system shown in the drawings and not herein claimed per se, may be of the simplest.

Tilting beam 116 is mounted in lengthwise tapered slot 117 of backbone 89 to pivot on fulcrum 118 which lies in transverse turning axis l—m of the backbone. The front end of beam 116 is rigidly joined by yoke 119 to front suspension arms 120 and the rear end of beam 116 is rigidly joined by yoke 121 to rear suspension arms 122. Front suspension arms carry steering joints 123 and stub axles 124 and rear suspension arms have pivotal attachments 125 to the housing 126 for driving axles 127. Hydraulic shock absorbers 128 damp relative movements of suspension arms and spread opposite ends of the backbone and slotted restrainers 129 fixed to backbone hold the outer ends of the suspension arms to predetermined up and down movement in a radius centered on fulcrum 118. Rubber bushings around opposite ends of tilting beam 116 and between plates 113 and 114 are not here shown. Prime-mover 130 with mainshaft 131 is geared through change-speed mechanism and differential 132 to driving axles 127 and back end of prime mover is supported by transverse resilient member 133 and shackles 134 on spread ends 115. Front suspension arms are operatively connected with torque-arms 135 of torsion stabilizer 136 mounted in bushings 137 transversely of spread front ends of backbone 89. Fuel storage tank 138 with filling inlet 139 is supported on backbone in counterbalance with waste-storage tank 8.

In the section of mainfloor shown in Fig. 5, rib-like stiffeners 140 for floor 88 taper outwardly and upwardly on opposite sides of backbone 89 and have their deeper inner ends rigidly fixed thereto. In cross section, stiffeners 140 comprise triangular metal loops supporting decking 141 which is surfaced with floor covering 142, such as carpet or linoleum and under decking 141, stiffeners 140 keyably support slabs 143 of lightweight aircell insulation, such as cork or a rigid foam of styrene resin or rubber. Outer ends of floor stiffeners 140 are fixed to sill members 144 which are supported by the outwardly bowed and forwardly and rearwardly bowed side stiffeners or ribs 145 in the shell 1 and ribs 145 are fixed to and suspended from the top-frame comprising longitudinal side members 96, crossties 146 and bracing blocks 147 which frame rectangular open areas in the roof structure, one NOPQ directly above front bedroom F and another PQRS directly above rear bedroom G. It is at this point that the body structure deviates from the common practice of superimposing the body load directly on the sills to which the main wheel-suspension elements (springs) are commonly attached.

As seen in Fig. 6, columns 21 directly support the topframe or backbone 89 and bowed rib-like side and end stiffeners 145 and sill members 144 are, in part, suspended from the topframe. Four columns 21 stand at the corners of a space having a rectangular horizontal cross section about half the width of the body and, in all, seven columns 21 are fixed between the backbone and topframe, three at each end of the rectangular space just mentioned and one in the middle thereof. Taken together an an integral unit, backbone, columns and topframe comprise a framework that supports the body shell on the roadwheels. Columns 21 may comprise relatively small diameter metal tubing since intermediate parts of each of the seven columns are stiffened by the web-like ties 22 fixed between said intermediate parts and the spaced contiguous parts of the outer shell 1. These ties, if vertical, thus become bulkheads or, if horizontal, become floors and ceilings, and the structure achieves a body combining maximum rigidity with minimal weight as is evident from the fact that the entire vehicle, as herein described, weighs under 8 tons, which is for a vehicle intended to be driven off the highway and into woods and fields and is thus subject to greater twists and strains than a railcoach running on relatively smooth and level rails. To keep center of gravity low, it is to be noticed that the horizontal plane of greatest width and length is only slightly above the tops of the roadwheels. The framework just described also includes intermediate joist 148 supported by three of the seven columns 21 substantially in the lengthwise center axis of the body and at a level approximately midway between backbone and topframe. Top edge of joist or web-like tie 148 supports inner margin of ceiling 150 having outer margin fixed to horizontal stiffener 149 fixed to side stiffeners 145 for one side of body shell 1; whereas bottom edge of joist or web-like tie 148 supports inner margin of ceiling 150 having outer margin fixed to horizontal stiffener 149 fixed to side stiffeners 145 on the opposite side of body shell 1. Side stiffeners 145 may comprise tubular ribs or elements formed in or joined to the rigid covering 10 of shell 1 and similar to floor stiffeners 140. Like the floor, the sides and ends of the shell are insulated with a material similar to that shown at 143. In addition to the bracings against distortion described, the body is also braced by the slight downward slope of the mainfloor from opposite ends thereof and toward transverse turning axis l—m, and by the oppositely slanted stairways, and by an outward bulge in the shell extending horizontally completely around the body and by end-decks fitting into this bulge at some distance above the spread opposite ends of the back bone.

Ceiling 100 on one side of longitudinal center axis j—k is at story height above mainfloor 88, whereas ceiling 150 is at less than said height from the mainfloor on the opposite side of the axis except above bathroom E where the ceiling comprises the underside of dresser 63 except for diagonal well 151 over entrance into bathroom from afterdeck. Lengthwise, ceiling 100 extends between diagonal stairwells 101 and comprises the actual bottoms of end to end double legless beds or berths 60. Upper surface of ceiling 150 provides the upper story floor and berths 60 are at bed-height above this floor. Floor space in lounge A under ceiling 150 has ample head-height to permit comfortable occupation of seats 14. Cabinet 3, storage closet 4 and parts of kitchenette C positioned under ceiling 150 are directly accessible from the story-height areas under ceiling 100. The vertical space directly above the inner marginal parts of ceiling 150 in the upper story of the body is normally slightly less than the height of the average adult American male in erect posture to meet limitations on overall height in transit imposed by statute. Even under in-transit conditions, the central passage between opposite end decks in the upper story has ample head-height for women and children of average height in erect posture and for everyone in sitting or reclining posture which is the main purpose of bedrooms.

Off the highway the vertical space above the upper passage is extensible by tilting upwardly either one or both closures 152 for areas NOPQ and PQRS. It is to be noted that together both closures 152 cover practically the entire upper passage and adjusting the closures upwardly increases the vertical space of the passage to more than the standing height of an adult male. Suitable flyscreens and/or apertured side-curtains (not shown) may be fastened over the open gap thus formed between fixed parts of the roof and the upward adjusted closure and the ventilation and lighting of the upper story greatly increased. Or transparent portions 153 may be provided in closures 152 for this puropse.

Heat that has risen to top of ceiling 100 may flow through opening closures or registers 154 to escape through apertures 97 or raised closures 152. Risers in front and rear stairs are inclined at an angle to increase tread-depth and to reduce to a minimum the waste space usually found under stairways. Retractible chimney top is shown in Fig. 7 in raised position as suited to use parked off the highway, but in Fig. 8 radius r indicates how the chimney top 83 is turned down to retracted position shown in Fig. 10 behind comb 81 and between openings 155 in roofstep which serve in transit to ventilate upper story. In the retracted position, orifice 156 in smoke pipe 31 is open as described in an area of sub-normal air pressure or suction back of said comb.

Fuel-oil tank 157 under stairway 20 and between the inner sides of the front wheelwells 94b is fillable by pipe 158 closed by cap 159. Metering valve 160 feeds oil from this tank through pipe 161 into burner 162 by gravity and burner 162 is also between inner sides of the spaced front wheelwells 94b. Ventilating ducts 66 may be used to suck air from or carry fresh air into the body by adjusting the trailing edge 163 of the sides of comb 81 as shown in enlarged detail in Fig. 11 and Fig. 12, where the trailing edge 163 is seen to comprise a V-flap with pivot 164 between outer wing 165 and inner wing 166. Edge 167 of outer wing rests normally on flange 168 and flush with roof 169 forwardly of the flap. Inner wing has closable but normally open apertures 170 and edge 171 fits against shoulder 172 in roof 169. When the flap is in position shown in Fig. 11, forward motion of the body causes airstream to flow at super-normal pressure over roof 169 in direction of the arrow. The resulting sub-normal pressure created back of wing 166 draws air from the interior of body through opening 79 at lower end of duct 66 and upwardly and out through apertures 170. Close these apertures and tilt flap to position shown in Fig. 12 and air at super-normal pressure is diverted downwardly through duct 66 and out through opening 79 into the body. This flap permits meeting the directly opposite conditions encountered in winter and summer driving.

Lavatory, sink, laundry tubs are connected through trap 173 and pipe 174 with waste-tank 8 and bathing receptacle is sufficiently raised above the bottom of stiffeners 140 to be insulated and drain into waste-tank. Another waste-tank 175 may serve toilet-stool to retain solids therein. When the body is parked, all utilities available at the parking site, such as water under pressure, electricity, telephone and sanitary sewer, may be simply joined to all utilities available in the body by a unitary utilities connector (not shown) such as I described in Popular Science magazine of August 1934. In transit and when temporarily parked, tank 8 receives all fluid wastes in a sanitary manner and vented by stack 9 till they can be suitably voided; and it is obvious that availability of a prime mover in a mobile dwelling provides means when far from essential utilities for pumping a supply of water, producing electricity for lights, radio and motors and utilizing the waste heat for space-heating and other purposes.

From the above detailed description it is apparent that the structure achieves each of the stated objects of the invention. My mobile dwelling as specifically defined and described clearly differentiates from the automotive clamping vehicles and trailer coaches of much smaller volume intended for temporary domestic use when parked. My mobile dwelling as specifically defined and described also clearly differentiates from the very large, heavy and costly rail vehicles designed for public transport and intermittent individual use. The invention concentrates as many as five housekeeping rooms exclusive of closets and the like together with all essential accessories between bulkheads above the nearest extremities of fore and aft roadwheels and in the easy-riding zone therebetween, the bulkheads spaced at a distance one from the other not substantially exceeding twice the in-transit maximum width of a body legal of passage on the average public highway as a common road vehicle. As many as four double berths in four zones of privacy are available for the accommodation of as many as eight occupants. This provides more than ample accommodation for the dwelling comfort of an entire family of larger than the American average size and a greater degree of privacy that is commonly available in the average fixed urban apartment. Finally, the invention provides shelter of constant use in habitation and heating, ventilating and sanitary facilities, including mechanical laundering facilities, as useful when the dwelling is on the highway in motion as when parked on or off the highway.

Study of the prior art fails to discover a single instance of the several rooms of a sanitary housekeeping dwelling apartment and of a size approaching dimensions meeting accepted standards for health and decency being concentrated in the easy-riding zone between the back of the front wheels and the front of the rear wheels and at the general floor level of the center side parts of the roadwheels, much less a space-saving apartment including facilities for human repose in upright and horizontal position in so many spacious zones of privacy and for space heating and for forced duct ventilation and for the cold storage and heating of food and water and for the washing of dishes and the mechanical laundering of clothes and for tub-bathing and for sanitary elimination and for the temporary storage in transit of fluid wastes. The novelty of the invention resides in its implementation of adequate mobile dwelling in private as contrasted with the temporary uses contemplated by camping vehicles and the intermittent public uses contemplated by rail vehicles.

The invention makes possible for the first time a house-sized mobile dwelling capable of being wholly completed in the factory, delivered on its own power, sold and financed without land entanglement, used with a minimum of manipulation, repossessed, traded in and resold exactly like a motorcar. It implements the growing passion for travel in a manner never contemplated by the prior art. And in an atomic era, when the threat of being blown to bits hangs over our most congested areas, it provides a form of family dwelling which can vacate such areas under threat of attack and implement the mass diffusion which is recognized as being the only effective safeguard to life and property.

The drawings, being illustrative only, are more or less diagrammatic in character to show the preferred relation of the parts to the whole and it is to be observed that changes may be made in certain parts without vitally altering the character of the whole or departing from the spirit and scope of the invention as set forth in the appended claims; and all changes which come within the meaning and range of equivalency of the claims are therefore intended to be embraced therein.

Having thus broadly defined and fully described my invention, its utility mobile and immobile and mode of operation, what I claim and desire to secure by Letters Patent of the United States is:

1. A housekeeping structure housed in a lightweight and highly torque-resistant road vehicle body including a supporting framework and a framework-supported outer shell, upright rectilinear parts of one being spaced from upright curvilinear parts of the other, and rigid web-like ties fixed between and stiffening the spaced parts and dividing the shell into fixed major subdivisions at different levels, several having both a width and length at least equalling the inside width of the body; ceilings for subdivisions at lower of said levels and spaced on opposite sides of the lengthwise center axis of the body, and a floor for one of said subdivisions at upper of said levels and extending between and below said spaced ceilings.

2. An automotive land cruiser having a supporting framework including vertical side and end members, and a framework-supported shell including outward bulging opposite sides and forward and rearward bulging opposite ends; intermediate parts of said framework inwardly spaced from intermediate upright parts of said shell; horizontal and vertical web-like ties fixed between said framework and said shell and dividing the habitable space into several major subdivisions at different levels; the forward vertical members of said framework standing between a fore driving deck at intermediate of said levels and a main lounge at lower, and a bedroom at upper of said levels; and the rearward vertical members of the framework standing between an aft observation deck at intermediate of said levels and a kitchenette and a bathroom at lower, and another bedroom at upper of said levels.

3. A rigid body housing a space-saving extensible dwelling apartment and having a fixed width and length legal for a common road vehicle; said body including an upper passage and a framework rigidly supporting said passage on ground-engaging means fore and aft; said framework comprising a rigid topframe and a keelson-like bottom girder and spaced columns fixed therebetween, and said topframe having crossties fixed between apertured side members to define two large rectangular open areas directly above said passage, and tiltable opening closures for said areas and upwardly opening to extend the vertical space above said passage.

4. A space-saving automotive vehicle having a body and roadwheels fore, aft and on opposite sides thereof, and means making said body lightweight and highly twist resistant and including a twist-resistant backbone having a midpart comprising two channel members laterally closely spaced and joined to provide a box-girder-like keelson in the longitudinal center axis of the body; said backbone having opposite ends spread to connect diagonally opposite lower extremities of the body, and columns fixed between said spread opposite ends and the body top at the corners of a rectangular space approximating the height and substantially less than the width of the body, and other columns fixed between said backbone and said body top and supporting an intermediate joist-like member at a distance both from said backbone and from said body top less than the erect height of an average American adult male, and a symmetrically curvilinear covering for said body and outwardly and downwardly diverging from the upper ends of said columns, and rigid ties fixed between said covering and said columns and interiorly dividing the body into a number of major subdivisions both above and below said intermediate joist-like member; and other means stiffening said body against torque and comprising pairs of oppositely inclined stairways above said spread opposite ends: each stairway having a landing fixed in a decided outward bulge in opposite ends and opposite sides of the body.

5. A highly twist-resistant body having a relatively lightweight shell and roadwheel support including several columns fore and aft and a backbone having widely spread opposite ends each supporting an upper division of the midportion of the body on some of said columns; opposite sides of said shell outwardly, and opposite ends of said shell forwardly and backwardly diverging downwardly from the tops of said columns and being returned toward the bottoms thereof at the level of maximum body width and length, and a body-stiffening bulge extending horizontally around the shell at said level and well above the bottom thereof; and floors supported on and at some distance above said spread opposite ends and fitting into said bulge to diffuse twist on said backbone widely over a considerable combined end and side area of said shell above said backbone.

6. A space-saving road vehicle having a rigid outer shell and roadwheels in wheelwells fore and aft and on opposite sides of the shell and columns adjacent the wheelwells and rigid ties between said shell and said columns, some of said ties comprising bulkheads one immediately back of the front roadwheels and another immediately forward of the rear roadwheels, and a ceiling for the midportion of the shell between said bulkheads; different areas of said ceiling being fixed at different levels above the general level of a main floor between said bulkheads; most of the vertical space below one higher area of said ceiling on one side of the longitudinal center axis of the shell and part of the vertical space below another higher area of said ceiling on the opposite side of said axis being of story height; and the vertical space below the balance of said ceiling being of less than story height; the total space between said bulkheads and below said ceiling being divided and fixedly equipped to comprise a two-room-and-bath housekeeping apartment, and the lower area of said ceiling comprising the underside of a floor for an upper division of said midportion, and part of said higher area of ceiling comprising the bottom of a berth accessible at bed-height from the adjacent floor, and part of said higher area of ceiling on the opposite side of said axis comprising the underside of a dresser top accessible at dresser top height from the adjacent floor.

7. In a road vehicle, a rigid space-saving body including a supporting framework and a framework-supported outer shell, columnar parts of one being spaced from upright covering parts of the other, and rigid web-like ties fixed between and stiffening the spaced parts and dividing the shell both horizontally and vertically into a number of major subdivisions at lower, intermediate and upper levels; one of said ties comprising a berth bottom and another comprising a transverse bulkhead; and a stairway between said levels and positioned athwart lower and upper openings in said bulkhead, and stairwells having oppositely inclined ceilings above said stairway: the ceiling of one well of said stairway on one side of said bulkhead slanting upwardly beginning at the horizontal plane in which the berth bottom lies, and the ceiling of the other well of said stairway on the opposite side of the bulkhead following the upward slant of the top of the shell.

8. In an automotive dwelling clearing a highway underpass of legal minimum height, a symmetrically curvilinear body and pairs of roadwheels spaced from each other fore and aft a distance not exceeding twice the width of the body; said body comprising an outer shell including upwardly curved intermediate side parts, and a roadwheel-supported framework spaced therefrom and including columnar elements between top and bottom frames; and vertical and horizontal web-like ties fixed between said elements and said side parts and dividing the shell, between said pairs of roadwheels, into rooms at upper and lower levels; two upper rooms having each a width and a length approximating the inside width of the shell, and a lower room having a width approximating, and a length exceeding, the inside width of the shell, and having a floor astride the lengthwise center axis of the body at the approximate level of the radial centers of the roadwheels.

9. A mobile body of fixed width legal of common transit on the public highway and comprising a lightweight outer shell having curved side portions and forwardly and rearwardly bulging end portions, and a framework having for a top a ventilator frame including a rigid pair of longitudinal members held spaced by crossties, and for a bottom a highly twist-resistant backbone including widened opposite ends and a keelson-like midpart, and columns having top and bottom extremities fixed to fore and aft and intermediate parts of said ventilator frame and of said backbone; and vertical and horizontal web-like ties fixed between said columns and said side and end portions to bring said shell and framework into highly coactive resistance to harmful rack in rough transit.

10. A double-deck road vehicle for driving safely off the highway and having a rack-resistant body on roadwheels fore and aft and including oppositely inclined pairs of body-bracing members on opposite sides of the transverse center axis of the body, each of the pairs comprising a single flight of stairs upwardly inclined toward and having risers upwardly inclined away from said axis, and a torque-resistant bottom frame member, the top parts thereof under said stairs upwardly diverging to slant away from said axis.

11. A rack-resistant road vehicle body several times longer than wide and having a roof clearing a 12 foot underpass over end compartments one extending considerably ahead of the forewheels and the other extending considerably behind the aftwheels, and a bumper-to-bumper frame within the bottom of the body and comprising a highly torque-resistant midportion projecting below said bottom centrally lengthwise thereof to closely clear passage over uneven ground and slanting up behind and between the forewheels and up ahead of and between the aftwheels to support opposite end portions of said frame extending under said compartments at a general level above the top side of said midportion to increase clearance under the bumpers, and communicating passages between said compartments at upper and lower levels, the lower including a floor resting on said top side of said midportion, and the upper including a floor at less than story height from said roof.

12. A road vehicle having a two-story body on roadwheels fore and aft and closely clearing an underpass of legal minimum height, said body including two compartments extending a considerable distance ahead of the forewheels and two compartments extending a considerable distance behind the aftwheels, one each of said two compartments of story height; and a rigid frame extending under and between said compartments and including a deep and narrow midportion in the bottom of the body, and projecting keel-like downwardly therefrom and centrally thereof, and horizontally extending end portions of said bottom frame supported at a level above the upperside of said midportion, and a floor over said upperside and having a top surface extending from front to rear compartments at a general level below the bottoms of said end compartments.

13. A vehicle body for group habitation and having an outer shell comprising upright curved midparts including forwardly bulging stiffeners spaced in the front end and backwardly bulging stiffeners spaced in the rear end and outwardly bulging stiffeners spaced in opposite sides of the shell, and primary wheel support for said shell and comprising a rigid framework much narrower and shorter than said shell and including upper and lower beam-like members and columns having opposite ends fixed between said members; some of said columns and one of said members lying generally in the same vertical plane as the lengthwise center axis of said shell, and rigid horizontal and vertical weblike ties including a floor and a bulkhead fixed between the sides of said columns and said curved midparts and dividing said shell into compartments at different levels: the forward one of said columns in said center axis and one of said bulkheads standing between a glazed foredeck and a living lounge at a lower level, and said floor extending between said foredeck and a minor compartment at the bottom front end of said shell.

14. A vehicle body for group habitation and having an outer shell comprising upright curved midparts including forwardly bulging stiffeners spaced in the front end and backwardly bulging stiffeners spaced in the rear end and outwardly bulging stiffeners spaced in opposite sides of the shell, and primary wheel support for said shell and comprising a rigid framework much narrower and shorter than said shell and including upper and lower beam-like members and columns having opposite ends fixed between said members; some of said columns and one of said members lying generally in the same vertical plane at the lengthwise center axis of said shell, and rigid horizontal and vertical weblike ties including a floor and a bulkhead fixed between the sides of said columns and said curved midparts and dividing said shell into compartments at different levels: the aft column in said axis and said bulkhead standing between a glazed afterdeck and a kitchen at a lower level, and said floor extending between said afterdeck and a minor compartment at the bottom rear end of said shell.

15. A vehicle body for group habitation and having an outer shell comprising upright curved midparts including forwardly bulging stiffeners spaced in the front end and backwardly bulging stiffeners spaced in the rear end and outwardly bulging stiffeners spaced in opposite sides of the shell, and primary wheel support for said shell and comprising a rigid framework much narrower and shorter than said shell and including upper and lower and intermediate beam-like members and columns having upper ends fixed between said upper and lower members; three of said columns and one of said members lying generally in the same vertical plane as the lengthwise center axis of the shell and rigid weblike ties including a floor and a ceiling above said floor fixed between the sides of said columns and said curved midparts and dividing said shell into compartments at different levels: said three columns and said intermediate member supporting said floor and ceiling between a bedroom at upper and a living lounge and kitchen at lower of said levels.

16. A transit ventilated road vehicle body for group habitation on roadwheels fore and aft and on opposite sides of the body and having a sanitary housekeeping structure concentrated between said roadwheels and a roof for said body, said roof forward of the forewheels having an area sloping gently backward and outward and upward to a roof comb, and an abrupt downward and inward step connecting said comb and the lower surface of said roof behind said comb and said forewheels, and a backwardly exposed outlet in undercut parts of said step and into the area of subnormal air pressure immediately behind said step created by airflow backwardly over said comb and causing said outlet to suck air from said body and from said structure in swift transit.

17. A transit-ventilated vehicle body having a roof and a topframe much narrower than said roof and extending in greater part over the midportion of the body between front and rear roadwheels and including beam-like side members standing above downwardly sloping side areas of said roof; said body comprising a forward bulging front end portion having a roof area sloping backward and upward and outward to a roof comb extending across the top and for some distance down opposite sides of said front end portion, and an abrupt downward and inward step between the outer limits of said comb and adjacent top and side parts of said topframe behind said comb, and backwardly exposed outlets in undercut side and top parts of said step for expelling air from widely spaced inner parts of the body in swift transit.

18. A transit-ventilated vehicle body including a roof, the front end thereof having an area sloping gently backward and upward to a roof comb extending transversely of the body, and a number of backwardly exposed outlet vents in said comb, and a side of the body comprising a duct having an inlet in a lower inside part of the body and said duct having an upper section connected with one of said outlet vents.

19. A transit-ventilated vehicle body having a roof, a small area thereof sloping gently backward and upward to a roof comb and an abrupt downward and inward step between said comb and the roof rearwardly thereof, and a duct in said roof and the side of said body and having a lower opening inside the body and two openings at the upper end of said duct, one an outlet vent in the backwardly exposed face of said step and the other an inlet port in said roof in front of the trailing edge of said comb and said trailing edge comprising a V-shaped flap adjustable to simultaneously cover said outlet vent and open said inlet port to scoop in-transit air downwardly through said duct and said lower opening into said body or to simultaneously cover said inlet port to void air sucked through said lower opening from the body and upwardly through said duct and said outlet vent into the low-pressure area immediately back of said vent.

20. In a doubledeck road vehicle having a height substantially less than two stories, a body having a midportion extending between front and rear roadwheels and interiorly divided to comprise upper and lower subdivisions, the lower having a usable floor area extending largely at the general level of the hubs of said roadwheels, and two ceiling areas at story height above said floor and spaced on opposite sides of the centrally lengthwise body axis; the upper of said subdivisions having a top comprising a fixed frame extending lengthwise between substantial roof areas downwardly curved from opposite side of said frame, and a foot passage extending between opposite ends of the upper of said subdivisions and below said spaced ceiling areas and at less than two story height both from said fixed frame and from said floor area, and said fixed frame having open areas extending lengthwise of and directly above said foot passage and rigid closures for said open areas and upwardly raisable to increase to story height the vertical space between said foot passage and said raised closures.

21. A road vehicle for group habitation and having a body on roadwheels fore and aft and an entrance door in one side of the body between the roadwheels on that side; said body interiorly divided for individual privacy into compartments at fixed upper and lower levels and having a floor connecting two lower compartments at the general level of the bottom of said door, and a ceiling for said two lower compartments and a legless berth fixed to one side of the body above said door and an upper floor connecting two upper of said compartments at a level below said ceiling and below the top of said door to make said berth directly accessible at slightly greater than normal bed height from said upper floor; said ceiling comprising the bottom of said berth.

22. A road vehicle for group habitation and having a body on roadwheels in wheelwells spaced fore and aft a distance not exceeding twice the body width and a torque-resistant frame within the body bottom and extending between the inner sides of each of the wheelwells, and two transverse bulkheads stiffening said body, one extending upwardly from said frame adjacent the back and inner side parts of one of the front wheelwells and the other extending upwardly from said frame adjacent the front and inner side parts of one of the rear wheelwells, and a floor astride the upper side of said frame between said bulkheads and having a top facing extending from said bulkheads to opposite sides of the body at the general level of the hubs of said roadwheels and spaced stiffeners for said floor, extending from said opposite sides of the body to opposite sides of said frame and fixed thereto and slabs of aircell composition keyably supported by and between said stiffeners to insulate said floor and the sanitary fixtures of the housekeeping structure for group habitation contained on and above said insulated floor between said bulkheads.

CORWIN D. WILLSON.

REFERENCES CITED

The following references are of record in the file of this patent:

UNITED STATES PATENTS

| Number | Name | Date |
| --- | --- | --- |
| 654,926 | State | July 31, 1900 |
| 1,217,174 | Hedley et al. | Feb. 27, 1917 |
| 1,580,661 | Funk et al. | Apr. 13, 1926 |
| 1,588,906 | Rackham | June 15, 1926 |
| 1,658,110 | Warren | Feb. 7, 1928 |
| 1,796,112 | McArthur, Jr. | Mar. 10, 1931 |
| 1,861,001 | Fageol | May 31, 1932 |
| 1,998,697 | Austin | Apr. 23, 1935 |
| 2,075,939 | Heyner | Apr. 6, 1937 |
| 2,101,057 | Fuller | Dec. 7, 1937 |
| 2,103,915 | Probst | Dec. 28, 1937 |
| 2,245,789 | Klavik | June 17, 1941 |
| 2,346,123 | Willson | Apr. 4, 1944 |

OTHER REFERENCES

"When is a Flivver Not a Flivver," The Evening Star, April 11, 1924, page 17.

"A Motorlounge," "The Autocar," Dec. 18, 1936, page 1212.